A. C. NIEMANN.
LATHE DOG.
APPLICATION FILED MAR. 9, 1911.
1,000,356.
Patented Aug. 8, 1911.
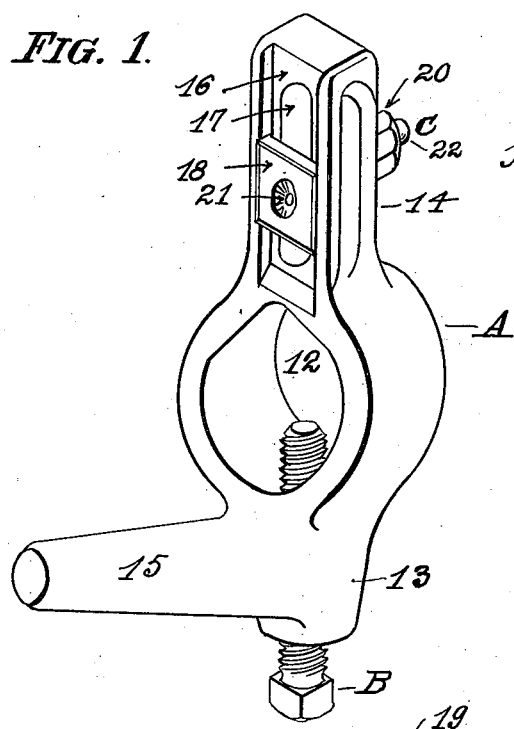
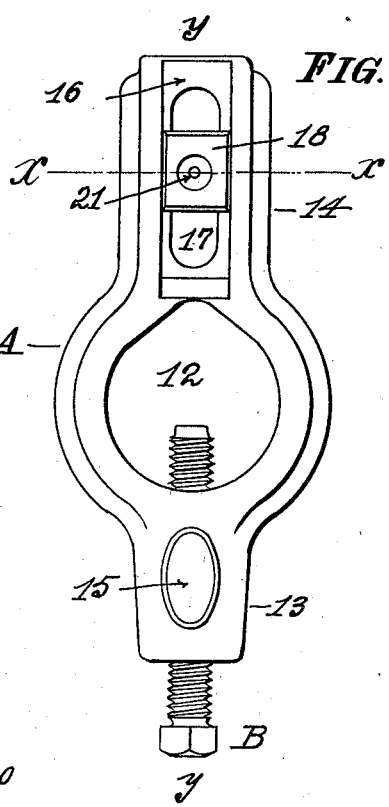
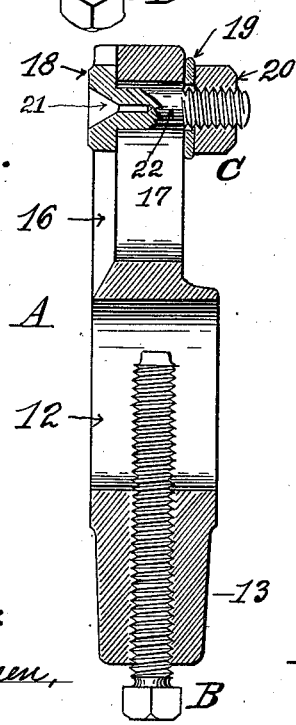
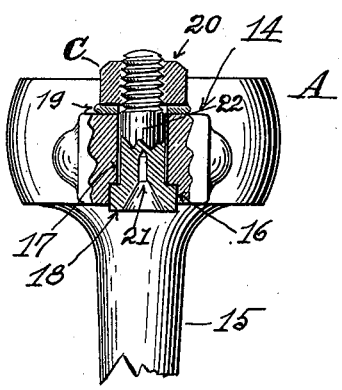
Witnesses:
C. B Knudsen,
A. G. Peterson.
Inventor:
ALFRED C. NIEMANN,
By Michael J Stark & Sons,
Attorneys

UNITED STATES PATENT OFFICE.

ALFRED C. NIEMANN, OF CHICAGO, ILLINOIS, ASSIGNOR TO HUGH A. WARNOCK, OF CHICAGO, ILLINOIS.

LATHE-DOG.

1,000,356.  Specification of Letters Patent.  Patented Aug. 8, 1911.

Continuation of application Serial No. 486,294, filed March 27, 1909. This application filed March 9, 1911. Serial No. 613,236.

*To all whom it may concern:*

Be it known that I, ALFRED C. NIEMANN, a citizen of the United States, and resident of Chicago, in the county of Cook and State of Illinois, have invented certain new and useful Improvements in Lathe-Dogs; and I do hereby declare that the following description of my said invention, taken in connection with the accompanying sheet of drawings, forms a full, clear, and exact specification, which will enable others skilled in the art to which it appertains to make and use the same.

This invention has general reference to lathe dogs; and it consists, essentially, in the novel and peculiar combination of parts and details of construction, as hereinafter first fully set forth and described, and then pointed out in the claims.

The object of this invention is the production of an efficient, serviceable, durable, and comparatively inexpensive lathe dog, which, although capable of being used for all the various purposes for which the common lathe dog now in very extensive use, is adapted, is especially designed for employment in connection with the turning, grinding, polishing &c., of crank shafts and similar articles of manufacture; and to attain this object, I construct this lathe dog, essentially, as shown in the drawings already mentioned, in which—

Figure 1 is a perspective view of this improved lathe dog. Fig. 2 is a side elevation of the same. Fig. 3 is a longitudinal sectional elevation on line *y y* of Fig. 2. Fig. 4 is a plan, partly in section, on line *x x* of Fig. 2.

Like parts are designated by the same characters and symbols of reference in all the figures.

This dog is of substantially the same general contour as the common lathe dog, that is to say, it comprises a body A, of approximately ring-shaped contour, it having an opening 12, adapted to receive the work which it is intended to engage, a head 13, longitudinally tapped for the reception of a set screw B, the driver 14, and the tail-piece 15, the latter member, instead of being a part of the driver as is usual with lathe dogs, being a part of the head 13.

The driver 14 is wider than the usual lathe dog, and it has a longitudinal recess 16, in its face, and through its body a slot hole 17, said recess 16 being constructed to receive the head 18, of a slidable bolt C, the screw-threaded shank 22 of which is passed through said slot hole 17, and carries a washer 19, and nut 20, at its end.

In the face of the head of the bolt C there is a countersunk oil hole 21, adapted to receive the center of a lathe, milling machine, grinding machine, or other machine tool, said bolt C being preferably made from a high grade of tool steel properly hardened and tempered to prevent wear.

For the purpose of turning or grinding the wrist pins of crank shafts there have been in use appliances by which the shaft proper may be placed eccentrically to the wrist pin or pins, but I am not aware that lathe dogs have been employed in which the countersink for the lathe center is movable so that crank shafts of various throws may be almost instantly held in proper position for operating on the wrist pin. Thus by slackening the nut 20 on the bolt C, and moving the bolt longitudinally in the slot hole 17, adjustment to accommodate the throw of any crank within the range of the dog may be almost instantly made. This feature of my invention is of considerable importance in automobile repair shops where crank shafts of automobile engines, boat engines and other motors are frequently handled to true up the worn wrist pins thereon, and where the cranks are of various throws. For this purpose two of my improved dogs are required, but since only one of these dogs is a driver of the work, the other need not be provided with the tail piece 15, and in Fig. 3 I have shown such a lathe dog, but it is evident that the two dogs required may be of either kind.

It is obvious that these dogs will be required in several sizes that is to say, having openings 12 of various diameters, and also drivers of several lengths to accommodate the throws of various crank shafts, a matter which will be fully understood by persons acquainted with the art to which this invention appertains.

Having thus fully described this invention, I claim as new and desire to secure to me by Letters Patent of the United States—

1. A lathe dog adapted for use on crank shafts, said lathe dog comprising a body having an opening adapted to receive a shaft, a head on said body, a set screw in said head, a tail piece on said head, a driver-member on said body having a slot hole, and a bolt movable in said slot hole and provided with means for fastening said bolt in adjusted position, there being a countersunk oil hole in said bolt adapted to receive the pointed end of a lathe center, as specified.

2. A lathe dog adapted for use on crank shafts, comprising a body having an opening adapted to receive said crank shaft, a head on said body, a set screw in said head adapted to enter said opening, a driver member on said body, there being a longitudinal recess in said driver member and a slot hole therein through said driver member, and a bolt movable in said slot hole, said bolt having a head engaging said recess and a countersunk oil hole in said head adapted to receive the pointed end of a lathe center, as set forth.

In testimony that I claim the foregoing as my invention, I have hereunto set my hand in the presence of two subscribing witnesses.

ALFRED C. NIEMANN.

Witnesses:
 MICHAEL J. STARK,
 FRIEDA T. LEBERSTEIN.